United States Patent [19]

Geerts et al.

[11] Patent Number: 5,399,622
[45] Date of Patent: Mar. 21, 1995

[54] SYSTEM OF CHROMIUM CATALYST AND YTTRIUM CATALYST, OLEFIN POLYMERIZATION PROCESS, AND POLYMER

[75] Inventors: Rolf L. Geerts; Elizabeth A. Benham; Max P. McDaniel, all of Bartlesville, Okla.

[73] Assignee: Phillips Petroleum Company, Bartlesville, Okla.

[21] Appl. No.: 153,694

[22] Filed: Nov. 17, 1993

[51] Int. Cl.[6] .................... C08F 4/78; C08F 10/02; C08F 10/14
[52] U.S. Cl. .................... 525/268; 526/97; 526/96; 526/114; 526/348; 526/905; 525/270; 525/245; 525/247; 525/902; 502/113; 502/112; 502/154
[58] Field of Search ............. 502/113, 112, 154; 526/96, 97, 114, 905; 525/245, 247, 268, 270

[56] References Cited

U.S. PATENT DOCUMENTS

| | | | |
|---|---|---|---|
| 4,263,422 | 4/1981 | Lowery, Jr. et. al. | 526/97 |
| 4,530,914 | 7/1985 | Ewen et al. | 502/113 |
| 5,032,651 | 7/1991 | McDaniel et al. | 526/96 |
| 5,066,739 | 11/1991 | Pettijohn et al. | 526/127 |
| 5,232,999 | 8/1993 | Conroy et al. | 526/129 |
| 5,237,025 | 8/1993 | Benham et al. | 526/114 |
| 5,242,876 | 9/1993 | Shamshoun et al. | 526/114 |
| 5,244,991 | 9/1992 | Geerts | 526/141 |

OTHER PUBLICATIONS

Journal of Organometallic Chemistry, 322 (1987) 321–329, "Synthesis and Coordination Chemistry of Permethylyttrocene Chloride", Klaas H. den Haan and Jan H. Tueben.

Organometallics 1985, 4, 554–559, W. J. Evans et al., "Synthesis and X-ray Crystallographic Characterization of an Asymmetric Organoyttrium Halide Dimer".

*Primary Examiner*—Mark Nagumo
*Attorney, Agent, or Firm*—Marianne H. Michel

[57] ABSTRACT

A catalyst system for the polymerization of alpha-olefins comprising a chromium-containing catalyst and an yttrium-containing catalyst wherein the yttrium-containing catalyst is represented by the formula $(Cp_2YX_{x-})_y \cdot M_zL_n$, wherein Cp is cyclopentadienyl or cyclopentadienyl substituted with alkyl or alkyl silyl radical or radicals, X is a halogen, M is an alkali metal, L is a suitable electron donor ligand, x is 1 or 2, y is 1 or 2, z is 0 or 1, and n is a number corresponding to the value needed to form a stable complex, with the proviso that when y is 2, z and n are 0 is provided. Also disclosed is a polymerization process employing such a catalyst system, and novel olefin polymers. Polymers thus produced exhibit high bulk density and a broad molecular weight distribution.

31 Claims, No Drawings

SYSTEM OF CHROMIUM CATALYST AND YTTRIUM CATALYST, OLEFIN POLYMERIZATION PROCESS, AND POLYMER

FIELD OF THE INVENTION

The present invention relates to the polymerization of olefins. In a particular aspect, the present invention relates to olefin polymerization employing a catalyst system comprising an yttrium-containing catalyst and a chromium-containing catalyst.

BACKGROUND OF THE INVENTION

Various techniques have been employed in the past for the polymerization of polymers and copolymers of olefins. One approach has involved employing catalysts containing chromium. Typically such polymerizations are carried out at relatively low temperatures and pressures.

For many applications, such as extrusion and molding processes, it is highly desirable to have polymers which have a broad molecular weight distribution. Such polymers exhibit excellent processability, i.e., they can be processed at a faster throughput rate with lower energy requirements with reduced melt flow perturbations.

Some techniques for preparing such polymers have involved the use of multiple reactor arrangements. Such multiple reactor schemes, while offering versatility in resin characteristics, can be less efficient than would be desired. Preparing the polymer in a single reactor would be much more economical.

It is also desirable to obtain a bimodal, or broad molecular weight distribution ethylene polymer in which comonomer is incorporated into the high molecular weight portion of the molecular weight distribution. Such polymers exhibit good impact resistance, tensile strength, elongation, flexural modulus, and environmental stress crack resistance.

In commercial applications, high bulk density is important for practical considerations such as convenient transfer and handling of the polymer. It is also important in commercial applications to be able to produce a wide spectrum of polymers so far as melt flow is concerned, i.e. molecular weight.

It would therefore be desirable to provide a catalyst capable of preparing polymers having high bulk density, broad molecular weight distribution with comonomer incorporated in the high molecular weight portion, while employing a single reactor.

SUMMARY OF THE INVENTION

It is an object of the present invention to provide a catalyst system useful for the polymerization of olefins having broad molecular weight distribution in a single reactor.

I t is another object of this invention to provide a polymerization process for preparing polymers having a broad molecular weight distribution which have branching in the high molecular weight portion.

It is another object of this invention to provide a polymer having high bulk density.

It is another object of this invention to provide a polymerization process for producing polymers having a wide range of molecular weights.

In accordance with the present invention, there is provided a catalyst system for the polymerization of alpha-olefins comprising a chromium-containing catalyst and an yttrium-containing catalyst, wherein the yttrium-containing catalyst is represented by the formula $(Cp_2YX_x)_y \cdot M_zL_n$, wherein Cp is cyclopentadienyl or cyclopentadienyl substituted with alkyl or alkyl silyl radical or radicals, X is a halogen, M is an alkali metal, L is a suitable electron donor ligand, x is 1 or 2, y is 1 or 2, z is 0 or 1, and n is a number corresponding to the value needed to form a stable complex, with the proviso that when y is 2, z and n are 0.

Other aspects of the present invention, are to provide a process for preparing such catalyst systems, a polymerization process employing such catalyst systems, and the olefin polymers thus produced.

DETAILED DESCRIPTION OF THE INVENTION

The particular chromium-containing catalyst employed can be readily selected by one skilled in the art after having the benefit of this disclosure.

A large number of patents exist describing various suitable chromium-containing catalysts. Some examples include U.S. Pat Nos. 3,887,494; 3,900,457; 4,053,436; 4,081,407; 4,101,722; 4,150,208; 4,151,122; 4,294,724; 4,296,001; 4,345,055; 4,364,839; 4,364,842; 4,364,854; 4,392,990; 4,397,765; 4,402,864; 4,405,501; 4,735,931; and 4,966,95 1; the disclosures of which are incorporated herein by reference.

Generally the chromium-containing catalyst is a chromium oxide. Preferably, a chromium-containing catalyst is selected that is not particularly affected by hydrogen or by the small amounts of the cocatalyst that is used with the yttrium-containing catalyst. It is also preferred that the chromium-containing catalyst be more effective in incorporating comonomer than the yttrium-containing catalyst under the selected polymerization conditions, thus producing a polymer having a relatively low density, i.e. a density in the range of from about 0.88 g/cc to about 0.93 g/cc measured according to ASTM D 1505-68.

The amount of chromium in the chromium-containing catalyst can vary over a wide range. Any suitable catalytic amount can be employed. Typically, the chromium-containing catalyst will contain about 0.1 to about 10 weight percent chromium based on the weight of the chromium-containing catalyst, more preferably about 0.1 to about 5 weight percent chromium.

The currently preferred chromium-containing catalysts are silica supported catalysts prepared by incorporating chromium on silica. More preferably, the chromium-containing catalyst further comprises titania.

Generally, the catalysts can be activated in air at a temperature in the range of about 300° C. to about 1000° C., preferably about 300° C. to about 800° C. Generally the activation is carried out for about one half to about 50 hours, preferably about 2 to about 10 hours.

Optionally, the chromium-containing silica can then be reduced with carbon monoxide at a temperature in the range of about 300° C. to about 500° C., preferably about 300° C. to about 450° C. Catalysts suitable for such an activation and reduction process include catalysts which are commercially available from W. R. Grace, Davison Catalyst Division, under the trade designations 963, 967 MS, 968 MS, 969 1D, and 969 MS.

The particular yttrium-containing catalyst to be employed can readily be determined by those skilled in the art after having had the benefit of this disclosure.

Such catalysts, for example, are disclosed in U.S. Pat. Nos. 5,066,739; 5,232,999; and 5,244,991, the disclosures of which are incorporated herein by reference. Preferably, an yttrium-containing catalyst is selected that is sensitive to the presence of hydrogen.

The yttrium-containing catalysts are represented by the formula $(Cp_2YX_x)_y.M_zL_n$, wherein Cp is cyclopentadienyl or cyclopentadienyl substituted with alkyl or alkyl silyl radical or radicals, X is a halogen, M is an alkali metal, L is a suitable electron donor ligand, x is 1 or 2, y is 1 or 2, z is 0 or 1, and n is a number corresponding to the value needed to form a stable complex, with the proviso that when y is 2, z and n are 0.

Generally, the substituents of the substituted cyclopentadienyl would each have 1 to 4 carbon atoms. Some specific examples of the Cp groups include cyclopentadienyl, ethylcyclopentadienyl, trimethylcyclopentadienyl, trimethylsilylcyclopentadienyl, and pentamethylcyclopentadienyl. Pentamethylcyclopentadienyl is preferred. The formula $H_5C_5$ is used herein to refer to cyclopentadienyl. The formula $Me_5C_5$ is used herein to refer to pentamethylcyclopentadienyl.

The halogens, X, of the above formula are preferably chloride or iodide, more preferably chloride.

Generally M is selected from lithium, sodium and potassium. Lithium and potassium are preferred.

The L of the above formula can be selected from any suitable electron donor ligand. Some specific examples of electron donor ligands include tetrahydrofuran, diethyl ether, and N,N,N',N'-tetramethylethylene diamine. Tetrahydrofuran (THF) is preferred.

Examples of specific yttrium-containing catalysts include

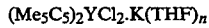

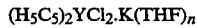

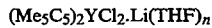

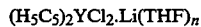

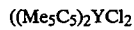

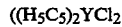

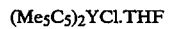

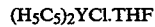

The compounds $Cp_2YX_2.ML_n$ and $Cp_2YX.L_n$ can be prepared by refluxing the electron donor ligand, an alkali metal hydride, and cyclopentadiene or a substituted cyclopentadienyl compound to obtain $MCp.L_n$. Yttrium trihalide, $MCp.L_n$, and the electron donor ligand are then reacted. Purified $Cp_2YX_2.ML_n$ and $Cp_2YX.L_n$ can be obtained by crystallizing the resulting reaction mixture. A typical liquid used for such crystallization could be toluene. The toluene soluble portion yields $Cp_2YX.L_n$ and the toluene insoluble portion yields $Cp_2YX_2.ML_n$.

For example, one method for preparing the yttrium-containing catalysts $Cp_2YX_2.K(THF)_n$ and $Cp_2YX.THF$ is to react pentamethylcyclopentadiene with potassium hydride by refluxing with tetrahydrofuran. The cyclopentadienyl potassium compound resulting from this step is then reacted with yttrium trihalide. The molar ratio of the cyclopentadienyl potassium compound to the yttrium trihalide compound is about 2 to 1. This reaction can be carried out by refluxing in THF.

The compound $(Cp_2YX)_2$ can be prepared by subjecting solid $Cp_2YX.L$ to sublimation under suitable conditions. It is generally found that the sublimation is adequately carried out at a temperature of about 230° C. when the electron donor ligand is THF.

The weight ratio of the yttrium-containing catalyst to chromium-containing catalyst can vary broadly depending upon the particular properties desired. As a general rule, the weight ratio of the yttrium-containing catalyst to chromium-containing catalyst would be in the range of from about 0.01:1 to about 100:1, preferably in the range of from about 0.1:1 to about 50:1, and more preferably in the range of from 0.1:1 to 10:1.

Typically the total catalyst system would be present in the range of from about 0.001 weight percent to about 1 weight percent based on the total weight of the polymerization reaction mixture.

Generally, it is advantageous to use the yttrium-containing catalyst in combination with a small but effective activating amount of an alkali metal alkyl or alkaline earth metal alkyl cocatalyst. Any suitable alkali metal alkyl old alkaline earth metal alkyl can be employed as the cocatalyst. Generally alkyllithiums are preferred. Generally the alkyl radicals of the cocatalyst would contain 1 to 12 carbon atoms, preferably 1 to 6 carbon atoms. Some specific examples of such cocatalysts include n-butylsodium, n-butyllithium, secondary-butyllithium, tertiary-butyllithium, n-butylpotassium, diethylmagnesium, di-n-butylmagnesium, and combinations thereof.

The ratio of the the cocatalyst to yttrium-containing catalyst can vary over a wide range depending upon the particular compounds employed and the particular results desired. As a general rule the molar ratio of the metal in the cocatalyst to the yttrium in the yttrium-containing catalyst will be in the range of from about 0.5:1 to about 20:1, preferably about 1:1 to about 15:1.

The present catalyst system is effective in polymerizing a wide range of olefins, particularly aliphatic alpha-olefins having 2 to about 18 carbon atoms, preferably 2 to 8 carbon atoms. The term polymerization is used herein to include both homo- and co-polymerization. Some examples of suitable olefins include ethylene, propylene, butene-1, hexene-1, octene-1, 4-methyl-1-pentene, and mixtures thereof.

The present catalyst system is particularly useful for the polymerization of ethylene in combination with small amounts of higher alpha olefin comonomer, such as butene-1 or hexene-1. Generally the comonomer is present in amounts of less than 20 weight % based on the weight of the ethylene. It is also within the scope of the invention to employ a chromium-containing catalyst capable of producing comonomer in-situ. Preferably ethylene polymers contain at least 90 mole percent ethylene, and more preferably at least 95 mole percent ethylene.

The polymerizations can be carried out in a slurry type process. Typically, this requires the employment of polymerization temperatures in the range of from about 0° C. to about 170° C., more preferably about 10° C. to about 100° C. The polymerization pressures are generally in the range of from about 100 psia to about 700 psia, or higher.

The reaction can be conducted in a batch reactor or in a suitable continuous reactor. It is generally preferable to carry out the polymerization in an elongated reaction tube which is contacted externally with suitable cooling media to maintain the desired polymerization temperature. A preferred technique uses a loop reactor in which the reaction mixture and polymer is circulated within a pipe loop. The time involved for the polymerization will vary depending upon the particular catalyst mixture employed, the temperature, and the desired type of polymer. Typically, when the polymerization is conducted on a commercial scale the residence time is in the range of about one half hour to about two hours.

It is generally desirable to carry out the polymerization in the absence of moisture and oxygen. As a general rule the polymerization is conducted in the presence of a suitable liquid diluent. Examples of such diluents include isobutane, n-butane, n-hexane, isooctane, cyclohexane, methylcyclopentane, dimethylcyclohexane, and combinations thereof.

In order to obtain polymers with particular physical properties it may be desirable to employ hydrogen during the polymerization period. Hydrogen, when employed, can vary over a broad range depending upon the particular compounds employed as the catalyst and the particular results desired. Typically, the hydrogen would be employed at a pressure in the range of from about 10 psi to about 200 psi, more preferably in the range of from about 15 psi to about 100 psi.

The monomers can be contacted with the yttrium-containing catalyst and the chromium-containing catalyst in any sequence desired. In a preferred embodiment, the monomers are contacted with the chromium-containing catalyst under polymerization conditions prior to contacting with the yttrium-containing catalyst.

In another embodiment, a polymer composite powder is provided comprising a low density ethylene polymer core surrounded by a high density ethylene polymer coating. The low density ethylene polymer core will generally have a density in the range of from about 0.88 g/cc to about 0.94 g/cc measured according to ASTM D 1505-68, preferably in the range of from about 0.90 g/cc to about 0.94 g/cc. The high density ethylene polymer coating will generally have a density in the range of from greater than about 0.94 g/cc to about 0.98 g/cc measured according to ASTM D 1505-68, preferably in the range of from about 0.95 g/cc to about 0.98 g/cc.

The amounts of low density ethylene polymer core and high density ethylene polymer coating can vary broadly. Generally the low density ethylene polymer core will be present in an amount in the range of from about 10 weight percent to about 90 weight percent based on the total weight of the polymer composite powder, preferably in the range of from about 25 weight percent to about 90 weight percent, and more preferably in the range of from 50 weight percent to 90 weight percent. Generally the high density ethylene polymer coating will be present in an amount in the range of from about 90 weight percent to about 10 weight percent based on the total weight of the polymer composite powder, preferably in the range of from about 75 weight percent to about 10 weight percent, and more preferably in the range of from 50 weight percent to 10 weight percent.

A further understanding of the present invention and its various aspects and advantages will be provided by the following examples. The following examples will serve to show the present invention in detail by way of illustration and not by way of limitation.

EXAMPLES

Examples IA and IB demonstrate the polymerization and properties of polymers prepared employing an yttrium-containing catalyst.

Example II demonstrates the polymerization and properties of polymers prepared employing a chromium-containing catalyst.

Example III demonstrates the polymerization and properties of a polymer composite prepared by first preparing ethylene copolymer with a chromium-containing catalyst and then polymerizing ethylene in the presence of the ethylene copolymer and an yttrium-containing catalyst.

Example IV demonstrates the polymerization and properties of polymers prepared employing a catalyst system comprising a chromium-containing catalyst and an yttrium-containing catalyst.

Example V was conducted on a pilot plant scale and demonstrates the polymerization and properties of polymers prepared employing a chromium-containing catalyst, an yttrium-containing catalyst, and a catalyst system comprising a combination of the two catalysts.

EXAMPLE IA

In Example IA, the yttrium-containing catalyst $Cp_2YCl_2K(THF)_n$ was employed to polymerize ethylene.

The yttrium-containing catalyst employed in Run 101 was prepared in the following manner. A slurry of 100 mL tetrahydrofuran (THF) and 2.56 g KH (0.064 moles) was prepared in a flask. To the slurry, 10 mL of pentamethylcyclopentadiene (0.064 moles Cp) were added by means of a syringe. The slurry was refluxed for 48 hours and then allowed to cool. The slurry was filtered separating a deep red solution and colorless solid. The colorless solid was washed with $2\times 25$ mL THF. Excess THF was removed from the solid material under vacuum and 13.5 g $KCp.THF_n$ was recovered.

To a round bottom, 500 mL flask, 2.00 g yttrium chloride (0.0102 moles $YCl_3$), was cautiously added to 100 mL of tetrahydrofuran (THF) with rapid stirring. In a dry box, 5.05 g of $KCp.THF_n$ (0.0205 moles), prepared as described above, was added to the reaction mixture over a period of 10 minutes. The light tan reaction mixture was stirred over night. The reaction mixture was filtered to remove residual solids. THF was removed from the filtrate in vacuum. The dried solids were extracted with $2\times 30$ mL toluene. The toluene insolubles yielded 4.23 g $Cp_2YCl_2K(THF)_n$. The toluene solubles yielded 0.63 g $Cp_2YCl \cdot THF$.

Polymerization was conducted in a four liter autoclave equipped with stirrer (1200 RPM) and jacket. The autoclave was charged with 0.0435 g $Cp_2YCl_2K(THF)_n$, the toluene insoluble fraction described above, 0.89 mL of 0.16 M n-butyllithium in hexane as cocatalyst, and 80 g of n-hexene-1 comonomer. The catalyst to cocatalyst molar ratio was 1:2 in the reactor. Two liters of isobutane diluent was then added and the reactor was pressurized with ethylene to yield a total pressure of 300 psig. Steam and water were introduced into the jacket to maintain a temperature of 90° C. After one hour of stirring the autoclave was opened and polymer was recovered. The polymer fluff was extremely fine, mostly smaller than 50μ (passes through a 325 mesh screen), and tended to have a static charge which made recovery difficult. The polymer coated the sides of the autoclave and produced a sticky film which was difficult to remove. The polymer also retained liquid isobutane diluent. Wet polymer fluff weighing 485 g, yielded 178 g after drying in an oven at 80° C. Total activity was 4081 g polymer/g catalyst·hour. The bulk density of the polymer produced was about 5 lbs/ft$^3$. The density measured according to ASTM D 1505-68 was 0.9751 g/cc, which indicated that no hexene was incorporated. The melt index measured according to ASTM D1238-65T, condition E, was too high to be measured, i.e. >500 g/10 min. The polymer was analyzed by size exclusion chromatography. The results are summarized in Table I

EXAMPLE IB

In Example IB, the yttrium-containing catalyst Cp$_2$YCl.THF was employed to polymerize ethylene.

The polymerizations in Runs 102-107 were conducted similar to Run 101, with the exception of employing the yttrium-containing catalyst Cp$_2$YCl.THF as catalyst and varying the temperature and amount of H$_2$ employed. Also, no hexene was employed in Example IB. The Cp$_2$YCl.THF was prepared as described above in Example IA, except the toluene soluble fraction was recovered and employed as the catalyst. The reaction conditions and results are summarized in Table I. Mw as used herein is weight average molecular and Mn is number average molecular weight. The bulk density of the polymer produced was about 5 lbs/ft$^3$.

TABLE I

| Run | Cat. | Temp. °C. | H$_2$ psig | IV | Mw/ 1000 | Mn/ 1000 | Mw/Mn |
|---|---|---|---|---|---|---|---|
| 101 | IA | 90 | 0 | — | 16.6 | 7.2 | 2.3 |
| 102 | IB | 90 | 0 | 3.9 | too high to measure | | |
| 103 | IB | 90 | 5 | 0.7 | 11.9 | 2.5 | 4.7 |
| 104 | IB | 90 | 100 | 0.6 | 6.4 | 1.2 | 5.5 |
| 105 | IB | 25 | 0 | 7.2 | too high to measure | | |
| 106 | IB | 25 | 5 | 0.5 | 6.2 | 1.9 | 3.3 |
| 107 | IB | 25 | 15 | 0.5 | 1.7 | 1.0 | 1.8 |

— did not determine

It can be seen from Table I, that the polymerizations were sensitive to hydrogen and reaction temperature, which can thus be used to control the molecular weight of the polymer. The results also show that the polymers exhibited a relatively narrow molecular weight distribution, i.e. Mw/Mn of 1.8 to 5.5.

EXAMPLE II

In Example II, polymerization runs were conducted employing a chromium-containing catalyst.

A commercial chromium-containing catalyst, Grade 963 Magnapore, purchased from W. R. Grace, Davison Catalyst Division, was employed. The catalyst was a chromium/silica-titania tergel prepared to contain 2.5% Ti. Prior to use, the chromium-containing catalyst was calcined in dry air at 870° C. for three hours and then exposed to carbon monoxide for one half hour at 350° C. Polymerization pressure was 450 psig. The polymerization reaction conditions and results are summarized below. MI as used herein is melt index in g/10 min. measured according to ASTM D1238-65T, condition E. HLMI as used herein is high load melt index in g/10 min. measured according to ASTM D1238-65T, condition F. Density was measured in g/cc according to ASTM D 1505-68.

TABLE II

| | Run | | |
|---|---|---|---|
| | 201 | 202 | 203 |
| Temperature (°C.) | 90 | 85 | 90 |
| Run Time (min.) | 30 | 35 | 60 |
| Wt. Cr cat. (g) | 0.50 | 0.24 | 0.27 |
| Polymer (g) | 308 | 237 | 607 |
| Productivity (g/g cat.) | 1235 | 1700 | 2250 |
| MI (g/10 min.) | 1.66 | 0.08 | 1.24 |
| HLMI (g/10 min.) | 93.8 | 10.3 | 71.0 |
| Density (g/cc) | 0.932 | 0.938 | 0.926 |
| Cocatalyst (mL 0.16 M BuLi) | 6.00 | 2.89 | 3.24 |
| Cocat/cat. | 10:1 | 10:1 | 10:1 |
| Mw | — | — | 14,500 |
| Mn | — | — | 2,700 |
| Mw/Mn | — | — | 5.4 |

— did not determine

Polymer density in the range of 0.926 to 0.938, indicated branching and in-situ hexene production.

EXAMPLE III

In Example III, ethylene copolymer was prepared employing a chromium-containing catalyst. The ethylene polymer was then contacted with the yttrium-containing catalyst of Example IA and ethylene to produce a composite polymer.

Ethylene copolymer was prepared by copolymerizing ethylene and 1-hexene employing the chromium-containing catalyst described in Example II, at a temperature of 90° C. and a pressure of 550 psig. The ethylene copolymer was recovered from the reactor and screened so that only coarse particles remained, i.e. larger than 20 mesh. The ethylene copolymer exhibited a high load melt index, HLMI, of 19 g/10 min. measured according to ASTM D1238-65T, condition F, a melt index, MI, of 0.20 g/10 min. measured according to ASTM D1238-65T, condition E, and a density of 0.923, measured according to ASTM D 1505-68.

A 200 g sample of the ethylene copolymer was introduced into the reactor. The reactor was degassed by pressurizing the reactor with nitrogen several times. Then 0.0222 g of Cp$_2$YCl. THF catalyst prepared as described in Example IB was added followed by 0.59 ml of butyllithium solution (1.6 molar). Two liters of isobutane were then added, followed by ethylene to yield a total pressure of 530 psig. The reactor temperature was raised to 90° C. and held for one hour. The reactor was cooled and the composite polymer recovered.

The recovered composite polymer retained the coarse particle size of the original ethylene copolymer and thus provided easy recovery and handling. The polymer yield was about 240 g. The yttrium-containing catalyst produced additional polymer at a productivity of about 2000 g/g catalyst. No fine polymer was found, which indicated that the polymer prepared by the yttrium-containing catalyst coated the polymer prepared by the chromium-containing catalyst, The composite polymer particles exhibited a melt index of 0.06 g/10 min., which indicated that very high molecular weight polymer produced by the yttrium-containing catalyst had coated the ethylene copolymer.

EXAMPLE IV

Polymerization runs were conducted employing the yttrium-containing catalyst $(Cp_2YCl)_2$ and the chromium-containing catalyst prepared as described in Example II.

The yttrium-containing catalyst, $(Cp_2YCl)_2$, was prepared by refluxing yttrium trichloride and pentamethylcyclopentadienyl sodium in THF and subjecting the resulting solid to sublimation at 230° C. The molar ratio of the yttrium trichloride to the pentamethylcyclopentadienyl sodium was 1:2. The reaction conditions and results are summarized in Table IV.

TABLE IV

| | Run | | | |
|---|---|---|---|---|
| | 401 | 402 | 403 | 404 |
| Temperature (°C.) | 90 | 90 | 90 | 90 |
| Time (min.) | 60 | 60 | 60 | 25 |
| wt. $(Ycp_2Cl)_2$ (g) | 0.0458 | 0.026 | 0.035 | 0.030 |
| wt. Cr/SiC.Ti (g) Cocat. | 0.0293 | 0.22 | 0.26 | 0.24 |
| mL n-BuLi | 3.58 | 0.69 | 2.40* | 0.8 |
| Cocat./Cr | 10:1 | 10:1 | 10:1 | 10:1 |
| Polymer recovered (g) | 189 | 200 | 98 | 364 |
| Productivity (g/g cat.) | 2513 | 815 | 332 | 3233 |
| MI g/10 min. | 0.01 | 0 | 0 | 0.03 |
| HLMI g/10 min. | 0.81 | 2.49 | 0.31 | 5.8 |
| Intrinsic viscosity | 3.38 | 5.82 | 8.25 | 3.60 |
| Density (g/cc) | — | — | — | 0.953** |

— did not determine
*0.091 M TEA used as cocatalyst
**20 mL hexane added

The low MI and HLMI values and high intrinsic viscosity indicated high molecular weight polymers were produced compared to polymer prepared with chromium-containing catalyst only. The density was also high compared to polymer prepared with chromium-containing catalyst only. These results indicated a strong contribution from the yttrium-containing polymer, The polymer was easy to handle and did not stick to the walls or the reactor.

EXAMPLE V

Yttrium-containing catalyst $Cp_2YCl_2Li.THF_n$, was prepared in a 500 mL round bottom flask. To the flask, 200 mL THF was added. The flask was placed in an ice bath and 10.0 g $YCl_3$ was slowly added while stirring, The mixture became cloudy with a slight greyish color. Then 14.56 g pentamethylcyclopentadiene lithium (LiCp) was added. The flask was removed from the ice bath and heated to reflux and maintained for 5 hours. The liquid was filtered and solvent was stripped from the filtrate. The yield was about 30 g solid $Cp_2YCl_2Li.THF_n$.

A commercial chromium-containing catalyst, Grade 963 Magnapore, purchased from W. R. Grace, Davison Catalyst Division, was employed as the chromium-containing catalyst. The catalyst was a chromium/silica-titania tergel prepared to contain 2.5% Ti. Prior to use, the chromium-containing catalyst was calcined in dry air at 649° C. for three hours.

Polymerization runs were conducted employing an 87 liter (23 gallon), 15.2 cm diameter pipe loop reactor. Two catalyst feeding vessels were employed with separate catalyst feeders for independent control of the catalysts.

In Run 503, polymerization was initiated and stabilized with the chromium-containing catalyst. Butyllithium was introduced into the reactor during the chromium-containing catalyst polymerization. Approximately 8 hours later, yttrium-containing catalyst was introduced into the reaction. The chromium-containing catalyst to yttrium-containing catalyst ratio was approximately 2:1 by volume. The reaction conditions and results are summarized below.

TABLE V

| | Run | | |
|---|---|---|---|
| | 501 | 502 | 503 |
| Temperature (°C.) | 89 | 88 | 87 |
| BuLi (ppm) | 4 | 8 | 4 |
| Hexene-1 (wt. % of ethylene) | 0 | 7 | 7 |
| MI (g/10 min.) | 10.1 | 0 | 0.37 |
| HLMI (g/10 min.) | — | 1.7 | 25 |
| IV | * | 3.66 | 2.26 |
| Density (g/cc) | — | 0.940 | 0.948 |
| Fluff Bulk Density (lbs/ ft³) | 2.5 | 20.9 | 21.3 |
| Mw/Mn | — | — | 14 |

— did not determine
* too high to measure

The ethylene copolymer prepared employing the catalyst system, Run 503, exhibited unexpectedly high bulk density and broad molecular weight distribution.

That which is claimed is:

1. A catalyst system for the polymerization of alpha-olefins comprising a chromium-containing catalyst and an yttrium-containing catalyst, wherein said yttrium-containing catalyst is represented by the formula $(Cp_2YX_x)_y.M_zL_n$, wherein Cp is cyclopentadienyl or cyclopentadienyl substituted with alkyl or alkyl silyl radical or radicals, X is a halogen, M is an alkali metal, L is an electron donor ligand, x is 1 or 2, y is 1 or 2, z is 0 or 1, and n is a number corresponding to the value needed to form a stable complex, with the proviso that when y is 2, z and n are 0.

2. A catalyst system according to claim 1 wherein said substituents of said substituted cyclopentadienyl each have 1 to 4 carbon atoms.

3. A catalyst system according to claim 2 wherein Cp is pentamethylcyclopentadienyl.

4. A catalyst system according to claim 1 wherein X is chloride or iodide.

5. A catalyst system according to claim 4 wherein X is chloride.

6. A catalyst system according to claim 1 wherein M is lithium or potassium.

7. A catalyst system according to claim 1 wherein L is tetrahydrofuran, diethyl ether or N,N,N',N'-tetramethylethylene dismine.

8. A catalyst system according to claim 7 wherein L is tetrahydrofuran.

9. A catalyst system according to claim 1 wherein said yttrium-containing catalyst is represented by the formula $Cp_2YX.THF$.

10. A catalyst system according to claim 1 wherein said yttrium-containing catalyst is represented by the formula $(Cp_2YX)_2$.

11. A catalyst system according to claim 1 wherein said yttrium-containing

12. A catalyst system according to claim 1 wherein said yttrium-containing catalyst is represented by the formula $Cp_2YCl_2.Li(THF)_n$.

13. A catalyst system according to claim 1 wherein said chromium-containing catalyst contains a chromium oxide.

14. A catalyst system according to claim 1 wherein said chromium-containing catalyst further comprises silica.

15. A catalyst system according to claim 1 wherein said chromium-containing catalyst further comprises titania.

16. A catalyst system according to claim 1 wherein said chromium-containing catalyst contains about 0.1 to about 10 weight percent chromium based on the weight of the chromium-containing catalyst.

17. A catalyst system according to claim 1 wherein said chromium-containing catalyst is activated in air at a temperature in the range of from about 300° C. to about 1000° C.

18. A catalyst system according to claim 17 wherein said chromium-containing catalyst is reduced with carbon monoxide at a temperature in the range of from about 300° C. to about 500° C.

19. A catalyst system according to claim 1 wherein said chromium-containing catalyst is more effective in incorporating comonomer than said yttrium-containing catalyst under polymerization conditions.

20. A catalyst system according to claim 1 wherein said chromium-containing catalyst is capable of preparing a copolymer in-situ.

21. A catalyst system according to claim 1 wherein said yttrium-containing catalyst is sensitive to the presence of hydrogen.

22. A catalyst system according to claim 1 further comprising a cocatalyst comprising an alkali metal alkyl or an alkaline earth metal alkyl.

23. A catalyst system according to claim 22 wherein said alkyl radicals of said cocatalyst contain 1 to 12 carbon atoms.

24. A catalyst system according to claim 23 wherein said cocatalyst is an alkyllithium.

25. A catalyst system according to claim 24 wherein said cocatalyst is n-butyllithium, secondary-butyllithium, tertiary-butyllithium.

26. A catalyst system according to claim 22 wherein the molar ratio of the metal in the cocatalyst to the yttrium in the yttrium-containing catalyst is in the range of from about 0.5:1 to about 20:1.

27. A catalyst system for the polymerization of alpha-olefins consisting essentially of a chromium-containing catalyst, an yttrium-containing catalyst, and a cocatalyst:

wherein said chromium-containing catalyst contains a chromium oxide; and wherein said yttrium-containing catalyst is represented by the formula $(Cp_2YX_x)_y \cdot M_zL_n$, wherein Cp is cyclopentadienyl or cyclopentadienyl substituted with alkyl or alkyl silyl radical or radicals, X is a halogen, M is an alkali metal, L is an electron donor ligand, x is 1 or 2, y is 1 or 2, z is 0 or 1, and n is a number corresponding to the value needed to form a stable complex, with the proviso that when y is 2, z and n are 0; and wherein said cocatalyst is an alkali metal alkyl or an alkaline earth metal alkyl.

28. A process for the polymerization of alpha-olefin monomers comprising contacting said monomers under polymerization conditions with a catalyst system comprising a chromium-containing catalyst and an yttrium-containing catalyst:

wherein said chromium-containing catalyst comprises a chromium oxide; and wherein said yttrium-containing catalyst is represented by the formula $(Cp_2YX_x)_y \cdot M_zL_n$, wherein Cp is cyclopentadienyl or cyclopentadienyl substituted with an alkyl or alkyl silyl radical or radicals, X is a halogen, M is an alkali metal, L is a suitable electron donor ligand, x is 1 or 2, y is 1 or 2, z is 0 or 1, and n is a number corresponding to the value needed to form a stable complex, with the proviso that when y is 2, z and n are 0.

29. A process according-to claim 28 wherein said contacting is at a temperature in the range of from 0° C. to about 170° C.

30. A process according to claim 28 wherein the polymerization is conducted in the presence of hydrogen.

31. A process according to claim 28 wherein said monomers are contacted with said chromium-containing catalyst prior to contacting with said yttrium-containing catalyst.

* * * * *

UNITED STATES PATENT AND TRADEMARK OFFICE
CERTIFICATE OF CORRECTION

PATENT NO. : 5,399,622

DATED : March 21, 1995

INVENTOR(S) : Rolf L. Geerts, Elizabeth A. Benham, Max P. McDaniel

It is certified that error appears in the above-identified patent and that said Letters Patent is hereby corrected as shown below:

Column 10, line 65, after "containing" insert therefor --- catalyst is represented by the formula $Cp_2YCl_2 \cdot K(THF)_n$ ---.

Signed and Sealed this

Thirteenth Day of June, 1995

Attest:

BRUCE LEHMAN

Attesting Officer        *Commissioner of Patents and Trademarks*